US012007109B2

(12) United States Patent
Plevnik et al.

(10) Patent No.: US 12,007,109 B2
(45) Date of Patent: Jun. 11, 2024

(54) AEROSOL GENERATION DEVICE WITH NON-VISIBLE ILLUMINATION UNIT

(71) Applicant: JT International SA, Geneva (CH)

(72) Inventors: Marko Plevnik, London (GB); Layth Sliman Bouchuiguir, Bellevue (CH)

(73) Assignee: JT International S.A. (CH)

( * ) Notice: Subject to any disclaimer, the term of this patent is extended or adjusted under 35 U.S.C. 154(b) by 0 days.

(21) Appl. No.: 17/912,231

(22) PCT Filed: Mar. 16, 2021

(86) PCT No.: PCT/EP2021/056639
§ 371 (c)(1),
(2) Date: Sep. 16, 2022

(87) PCT Pub. No.: WO2021/185815
PCT Pub. Date: Sep. 23, 2021

(65) Prior Publication Data
US 2023/0136898 A1 May 4, 2023

(30) Foreign Application Priority Data
Mar. 18, 2020 (EP) .................................... 20164046

(51) Int. Cl.
*F21V 33/00* (2006.01)
*A24F 40/60* (2020.01)
*F21Y 115/10* (2016.01)

(52) U.S. Cl.
CPC .......... *F21V 33/0004* (2013.01); *A24F 40/60* (2020.01); *F21Y 2115/10* (2016.08)

(58) Field of Classification Search
CPC ...... F21V 33/0004; F21V 33/00; F21V 99/00; A24F 40/60; A24F 40/00; A24F 40/50; A24F 40/46; A24F 40/20; F21Y 2115/10
See application file for complete search history.

(56) References Cited

U.S. PATENT DOCUMENTS 8,550,069 B2 * 10/2013 Alelov ................. A61M 11/005
128/202.21
2012/0048266 A1 3/2012 Alelov
(Continued)

FOREIGN PATENT DOCUMENTS

| | | | |
|---|---|---|---|
| CN | 202122096 | U | 1/2012 |
| KR | 20100097807 | A | 9/2010 |
| WO | 2015107552 | A1 | 7/2015 |

OTHER PUBLICATIONS

International Search Report for PCT/EP2021/056639 dated May 7, 2021. 4 pgs.

*Primary Examiner* — Bao Q Truong
(74) *Attorney, Agent, or Firm* — Lerner David LLP

(57) ABSTRACT

An aerosol generation device has a partially opaque portion for rendering an illumination unit non-visible when the illumination unit is not emitting light. An illumination unit for an aerosol generation device includes a plurality of light sources, wherein each of the light sources is configured to operate in a first power operation mode illuminating the light source at a first brightness level, and a second power operation mode for illuminating the light source at a second brightness level different from the first brightness level, wherein one or more light sources of the plurality of light sources form a contiguous illumination region when the one or more of the plurality of light source are emitting light, and wherein the illumination region is configured to provide to a user visual feedback that indicates a state of the aerosol generation device or a consumable used with the aerosol generation device.

17 Claims, 5 Drawing Sheets

(56) References Cited

U.S. PATENT DOCUMENTS

| | | | | |
|---|---|---|---|---|
| 2014/0007892 | A1 | 1/2014 | Liu | |
| 2017/0332702 | A1* | 11/2017 | Cameron | A24F 40/65 |
| 2018/0303169 | A1* | 10/2018 | Sears | A24F 40/50 |
| 2020/0154789 | A1* | 5/2020 | Novak, III | H05B 3/04 |
| 2020/0288781 | A1* | 9/2020 | Tang | A24F 40/60 |

* cited by examiner

AEROSOL GENERATION DEVICE WITH NON-VISIBLE ILLUMINATION UNIT

CROSS-REFERENCE TO RELATED APPLICATIONS

The present application is a national phase entry under 35 U.S.C. § 371 of International Application No. PCT/EP2021/056639, filed Mar. 16, 2021, published in English, which claims priority to European Application No. 20164046.3 filed Mar. 18, 2020, the disclosures of which are incorporated herein by reference.

TECHNICAL FIELD

The present invention relates to an aerosol generation device. In particular, the invention relates to an aerosol generation device with a partially opaque portion for rendering an illumination unit non-visible when the illumination unit is not emitting light.

TECHNICAL BACKGROUND

Aerosol generation devices commonly comprise light-emitting indicators to indicate technical information or an operational state of the device or the consumable.

Typically, the light-emitting indicators are arranged within the housing of the aerosol generation device, and the housing is provided with light-guide portions or holes to allow the light-emitting indicators to be visible to a user. However, since the light-transmitting holes or light-guides are visible to a user even when the light-emitting indicators are not emitting any light, discerning between a state in which the light-emitting indicators are emitting light, and state in which the light-emitting indicators are not emitting light, can be become challenging under disadvantageous lighting situations. Additionally, such configurations of the housing are not aesthetically pleasing as they break up the visual appearance of the outer surface of the aerosol generation device.

Furthermore, where an illumination unit for of the aerosol generation device comprises a plurality of light sources forming a contiguous illumination region, visual feedback that indicates a state of the aerosol generation device or a consumable used with the aerosol generation device is typically provided by a number of the light sources being illuminated ("on"), and the remaining lights sources not being illuminated ("off"). However, a user may not be able to easily discern those light sources which are "off". This is particularly true where the light sources of the illumination unit which do not emit light are difficult to detect by the eye of the user. The user may therefore have difficulties in understanding where the contiguous illumination region starts and where it ends, which may lead to a difficulty in understanding the value of the state indicated by the illuminated light sources.

Therefore, there is a need for an aerosol generation device with housing which is capable of a more reliable indication of information to a user of the device and/or which allows for an aesthetically pleasing design.

SUMMARY OF THE INVENTION

Some or all of the above objectives are achieved by the invention as defined by the features of the independent claims. Preferred embodiments of the invention are defined by the features of the dependent claims.

A first aspect of the invention is an aerosol generation device having a housing and an illumination unit capable of emitting light and covered by an exterior wall of the housing, the exterior wall comprising or substantially consisting of a light-transmissive portion arranged such that light emitted by the illumination unit is transmitted through the light-transmissive portion, wherein the illumination unit is not visible through the light-transmissive portion from the exterior of the device when the illumination unit does not emit light. The light-transmissive portion allows the illumination unit to be visible when the illumination unit is emitting light. Thus, it may allow the illumination unit to provide visual feedback indicating information regarding the aerosol generation device to a user of the device. On the other hand, the light-transmissive prevents the illuminations unit from being visible when it is not transmitting light, thus preventing that a user is lead to believe that the illumination unit is signaling certain information about the state of the device or the consumable, when in fact it is not. Furthermore, the non-visible illumination unit prevents any visual breakup of the lines and surfaces of the exterior surface of the device housing, which allows for an aesthetically pleasing design. It should be noted that term "not visible" refers to a non-visibility to the human eye that is achieved under common ambient lighting conditions.

According to a second aspect, in the preceding aspect, the light-transmissive portion comprises a laminar structure including a partially or fully transparent layer and a partially light-reflective layer. A laminar structure increases production flexibility. Furthermore, the layers of the laminar structure provide different characteristics for achieving light-transmission properties, in particular the property of transmitting light emitted by the illumination unit and of concealing the illumination unit from the eye of the user when it is not emitting light. The laminar structure may be adapted to suit different requirements and needs for the aerosol generation device and the respective production processes.

According to a third aspect, in the preceding aspect, the partially or fully transparent layer is arranged closer the illumination unit than the partially light-reflective layer. The light-reflective layer further improves the optical property of the light-transmissive portion by reflecting substantial parts of the light incident on the light-reflective layer from an exterior of the housing to improve concealment of the illumination unit when the illumination unit is not emitting light, and simultaneously allows light to transmitted through the light-reflective layer to an exterior of the housing to allow the illumination unit to visible through the light-transmissive layer when the illumination unit is emitting light.

According to a fourth aspect, in the preceding aspect, the partially light-reflective layer comprises a coating created by a physical vapor deposition (PVD), chemical vapor deposition (CVD) and/or non-conducting vacuum metallization (NCVM) process. These processes allow the accurate and precise deposition of layers onto a surface with well-defined properties for achieving desired optical properties of the light-reflective layer.

According to a fifth aspect, in any one of the second to fourth aspects, the partially light-reflective layer comprises an aluminum, copper, or bronze material. These are commonly available and cost-efficient materials that provide well-known light-reflective properties.

According to a sixth aspect, in any one of the preceding aspects, the laminar structure comprises a light-diffusive layer. The light-diffusive layer further aids in rendering the illumination unit non-visible when the illumination unit is not emitting light, while simultaneously allowing light to be transmitted through the light-diffusive layer.

According to a seventh aspect, in the preceding aspect, the light-diffusive layer forms the exterior surface of the light-transmissive portion. A light-diffusive layer as the exterior layer serves as a protective layer since damages to a light-diffusive layer, such as scratches, bumps, indentations and small holes are less visible on the light-diffusive layer due to the light-diffusive property than on a shiny, glossy or mirrored exterior layer.

According to an eighth aspect, in any one of the second to seventh aspects, one or more layers of the laminar structure are colored or tinted. This allows the light-transmissive portion to appear in various colors and tints for different visual appearances.

According to a ninth aspect, in any one of the preceding aspects, the housing comprises a main body on which the illumination unit is arranged, and a panel member that is movably and/or detachably attached to the main body and that comprises or substantially consists of the exterior wall of the housing. A movable and/or detachable panel that comprises the light-transmissive layer allows easy and convenient access to the illumination unit and other parts of the aerosol generation device in case maintenance or repairs are required.

According to a tenth aspect, in any one of the preceding aspects, the shape and/or length and/or width and/or radius of the light-transmissive portion corresponds to the shape and/or length and/or width and/or radius, respectively, of the illumination unit. This improves the homogenous illumination of the light-transmissive portion by light emitted from the illumination unit.

According to an eleventh aspect, in any one of the preceding aspects, the length and/or width and/or radius of the light-transmissive portion is so small that the light-transmissive portion is not visibly discernible from the exterior of the device when the illumination unit does not emit light. This further serves for rendering the illumination unit non-visible to the human eye when the illumination unit is not emitting light.

According to a twelfth aspect, in any one of the preceding aspects, the illumination unit is positioned such that at least parts of the light emitted by the illumination unit passes through the light-transmissive portion in a direction substantially perpendicular to the exterior surface of the exterior wall of the housing. This aspect makes clear that the position of the light-transmissive portion substantially corresponds to the position of the illumination unit and ensures transmission of light emitted from the illumination unit through the light-transmissive portion to an exterior side of the light-transmissive.

According to a thirteenth aspect, in any one of the preceding aspects, the light-transmissive portion and at least parts of the housing adjacent to the light-transmissive portion and/or substantially the entire exterior wall of the housing are provided with substantially the same exterior surface finish. This reduces the visibility of transitions between the light-transmissive portion and adjacent parts of the housing such that the light-transmissive portion and the device housing are not visually discernible, to further conceal the illumination unit when no light is emitted.

According to a fourteenth aspect, in the preceding aspect, the surface finish is a glossy, mirrored, or matte finish. This allows the light-transmissive portion to appear with a desired visual effect, and may further improve concealment of the illumination unit when not emitting light. Furthermore, a glossy or mirrored surface finish may improve tactile grip of the exterior surface of the light-transmissive portion, while a matte finish may provide a finish that can mask or hide surface imperfections due to, for example, the aerosol generation device being subjected to wear and tear.

According to a fifteenth aspect, in the preceding aspect, the surface finish is provided by one of the light-reflective layer, the light-diffusive layer, and a combination thereof. This may eliminate the need for an additional or separate step for providing a surface finish.

According to a sixteenth aspect, in any one of the preceding aspects, the illumination unit comprises one or more LED light sources or LED light strips. LED light sources offer high energy efficiency, longevity, miniaturization capabilities and low heat generation, making them ideal for use in small and portable devices such as an aerosol generation device.

According to a seventeenth aspect, in any one of the preceding aspects, the illumination unit comprises a plurality of light sources arranged in a straight or curved line.

An eighteenth aspect of the invention is an illumination unit for an aerosol generation device, comprising a plurality of light sources, wherein each of the light sources is configured to operate in a first power operation mode illuminating the light source at a first brightness level, and a second power operation mode for illuminating the light source at a second brightness level different from the first brightness level, wherein one or more light sources of the plurality of light sources form a contiguous illumination region when the one or more of the plurality of light source are emitting light, and wherein the illumination region is configured to provide to a user visual feedback that indicates a state of the aerosol generation device or a consumable used with the aerosol generation device. It should be noted that the first brightness level and the second brightness level are non-zero brightness levels. Like in the prior art, a state may be indicated by operating a number of the light sources in the first power operation mode ("on"). However, the difference in brightness between the first brightness level and the second brightness level allows the illumination unit to operate (illuminate) even those light sources which are "off", e.g. with less power, rather than operating them not at all. This has the advantage that a user can more easily discern even those light sources which are "off". This is particularly true if the illumination unit is used in an aerosol generation device according to any one of the first to seventeenth aspects, where the illumination unit is not visible from the exterior of the device when the illumination unit does not emit light, or in general in a device where the light sources of the illumination unit which do not emit light are difficult to detect by the eye of the user. It should be further noted that the term "light sources" refers to parts or components that generate light. These light sources typically are incandescent or luminescent light sources such as, but not limited to, incandescent light bulbs or LEDs.

According to a nineteenth aspect, in the preceding aspect, the illumination region comprises a region illuminated at the first brightness level and/or a region illuminated at the second brightness level. This enables the illumination unit to indicate states based on the region at the first brightness level and the region at the second brightness level.

According to a twentieth aspect, in the preceding aspect, the full extent of the illumination region is either the extent of a region illuminated at the first brightness level, if the illuminated region contains only the region illuminated at the first brightness level, or the combined extent of a region illuminated at the first brightness level and a region illuminated at the second brightness level, if the illumination region contains only the region illuminated at the first brightness level and the region illuminated at the second brightness level, or the extent of a region at the second brightness level, if the illumination region contains only the region illuminated at the second brightness level.

According to a twenty-first aspect, in the nineteenth or twentieth aspects, the visual feedback is based on a relation between the extent of the region illuminated at the second brightness level and the full extent of the illumination region. This enables the illumination unit to indicate a state based on the full extent of the illumination region as a reference for the indicated state.

According to a twenty-second aspect, in the eighteenth to twenty-first aspects, the full extent of the illumination region is indicative of a maximum range of values of a state indicated by the visual feedback.

According to a twenty-third aspect, in the preceding aspect, the extent of the region illuminated at the second brightness level is indicative of the a sub-range within the maximum range of values for the indicated information, and the extent of the sub-range in relation to the extent of the maximum range of values corresponds to the extent of the region illuminated at the second brightness level in relation to the full extent of the illumination region. This enables the illumination unit to indicate more complex states, in particular states within a reference range or in relation to a particular reference point of technical relevance to the aerosol generation device or the consumable in use with the aerosol generation device.

According to a twenty-fourth aspect, in any one of the eighteenth to twenty-third aspects, each of the plurality of light sources is an LED which is capable of emitting light in a plurality of colors.

According to a twenty-fifth aspect, in the preceding aspect, the illumination region is illuminated in a color.

According to a twenty-sixth aspect, in any one of the twenty-fourth or twenty-fifth aspects, different colors of the illumination region are indicative of different types of information. This enables to illumination unit to indicate several types of states.

According to a twenty-seventh aspect, in any one of the eighteenth to twenty-sixth aspects, the illumination unit is configured to form one or more patterns on the illumination region, wherein each of the one or more patterns is indicative of different states of the aerosol generation device or a consumable used with the aerosol generation device. This enables the illumination unit to simultaneously indicate one or more types of states.

According to a twenty-eighth aspect, in the preceding aspect, at least one of the one or more patterns includes a moving pattern or a dynamically changing pattern.

According to a twenty-ninth aspect, in the preceding aspect, the moving direction of the moving pattern indicates a change in the state indicated by the one of the one or more patterns. The twenty-eighth and twenty-ninth aspects of the invention enable to illumination unit to indicate changes in an indicated state.

According to a thirtieth aspect, in any one of the eighteenth to twenty-ninth aspects, the states of the aerosol generation device or a consumable used with the aerosol generation device comprise at least one of: elapsed and/or remaining start-up time period of the device, vaping progress on the device, time of use of the device since start-up, consumed and/or remaining amount of aerosol generation substrate in the consumable, an operational temperature of the device, and depletion level of a battery of the device. Indicating these states to a user provides the user with information based on which the user can correctly operate, maintain and/or care for the aerosol generation device or the consumable in use with the aerosol generation device.

According to a thirty-first aspect, in the preceding aspect, the start-up time period is a time period required for heating-up a heating unit comprised by the aerosol generation device before the user can start consuming the consumable. This enables the user to operate the aerosol generation device and the consumable in use with the aerosol generation device in a predetermined manner.

According to a thirty-second aspect, in any one of the eighteenth to thirty-first aspects, the plurality of light sources is arranged in a straight or curved line, and/or the illumination region comprises a curved or bent shape.

According to a thirty-third aspect, in any one of the eighteenth to thirty-second aspects, the second brightness level is higher than the first brightness level.

According to a thirty-fourth aspect, in any one of the eighteenth to thirty-third aspects, the first brightness level is at least 2%, preferably at least 3%, more preferably at least 5% of the maximum brightness of each of the light sources, and at most 30%, preferably at most 20%, more preferably at most 15% of the maximum brightness of each of the light sources. These brightness levels offer a compromise between a visibility and visual contrast of regions at the first brightness and energy consumption of the illumination unit.

According to a thirty-fifth aspect, in any one of the eighteenth to thirty-fourth aspects, the second brightness level is at least 70%, preferably at least 80%, more preferably at least 90% of the maximum brightness of each of the light sources. These brightness levels provide an optimal contrast between regions of the illumination region illuminated at the first brightness level, and regions of the illumination region illuminated at the second brightness level, and further improve visibility of the illumination region under ambient lighting conditions.

According to a thirty-sixth aspect, in the first aspect, the illumination unit is an illumination unit according to any one of the eighteenth to thirty-fifth aspects of the invention.

DETAILED DESCRIPTION OF PREFERRED EMBODIMENTS

Preferred embodiments of the present invention are described hereinafter and in conjunction with the accompanying drawings.

Figure 1:
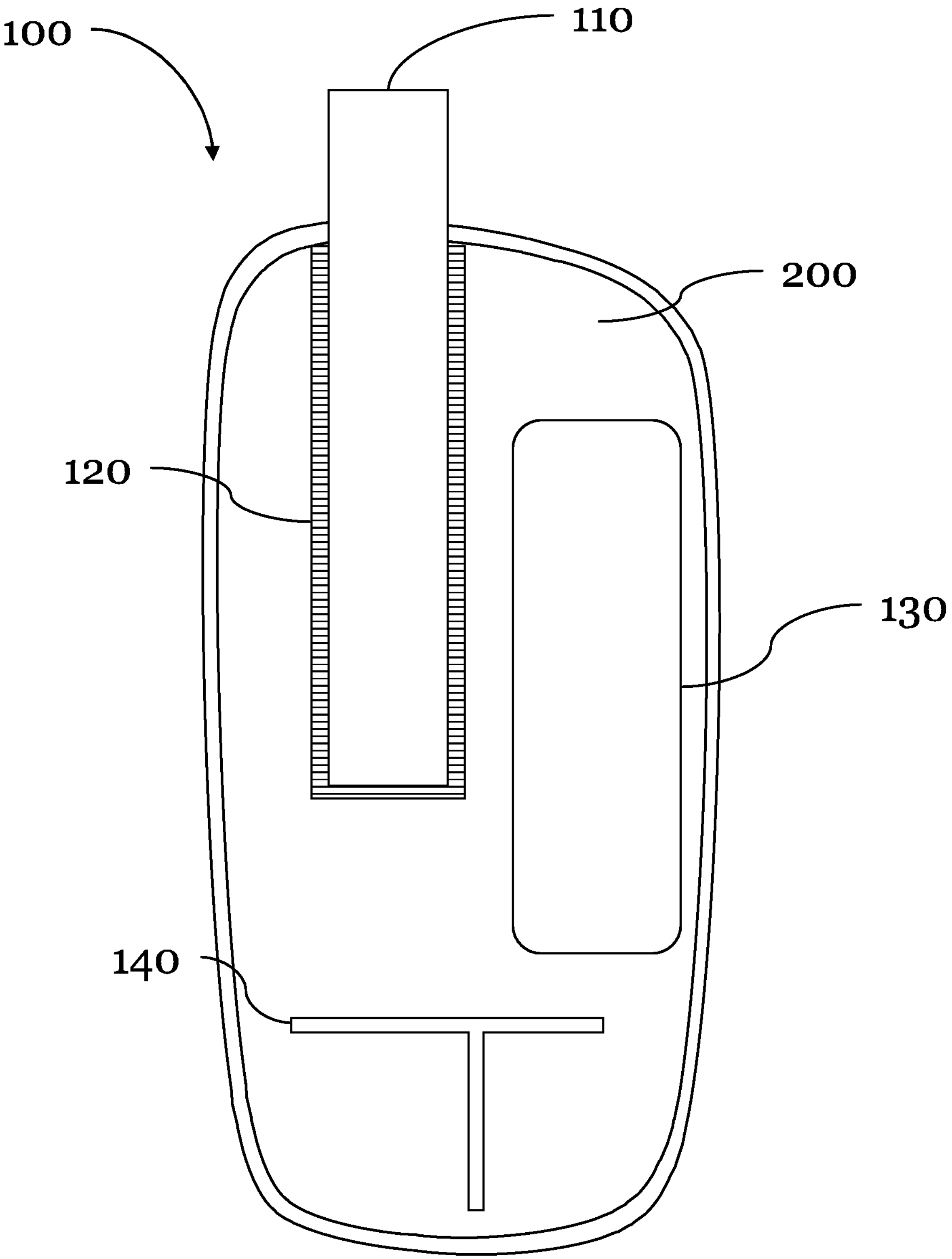
FIG. 1 shows a schematic illustration of an aerosol generation device according to embodiments of the invention.

An aerosol generation 100 as depicted in FIG. 1 commonly comprises a housing with an opening 210 through which an aerosol generation substrate 110 such as a liquid or tobacco stick may at least partially be inserted into an aerosol generation chamber 120 of the device. The device 100 further comprises a power source 130 that may be a rechargeable and/or exchangeable power source such as a battery, and circuitry 140 for controlling operation of the aerosol generation device 100.

Figure 2C:
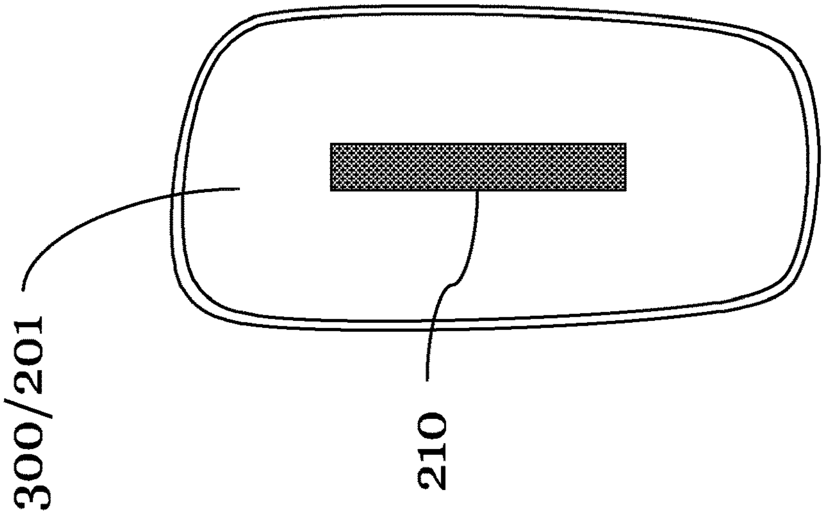
FIGS. 2A, 2B and 2C show schematic illustrations of a front view of an aerosol generation device with a light-transmissive portion and an illumination unit, according to embodiments of the invention.
Figure 2B:
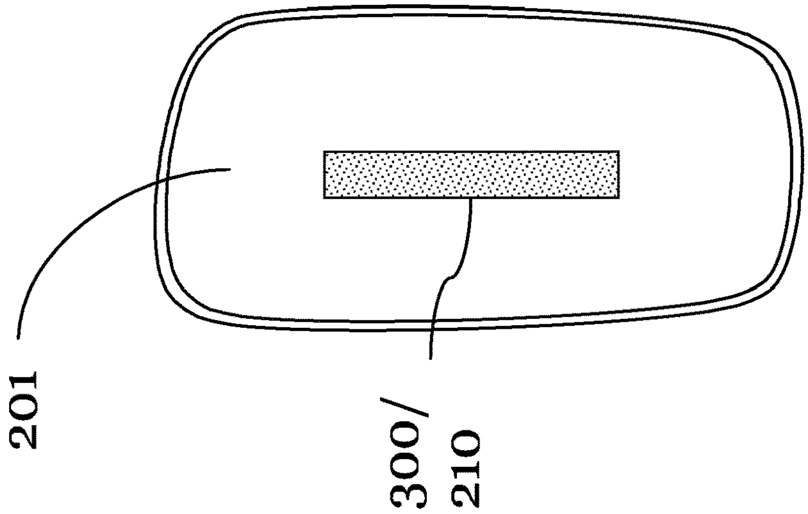
Figure 2A:
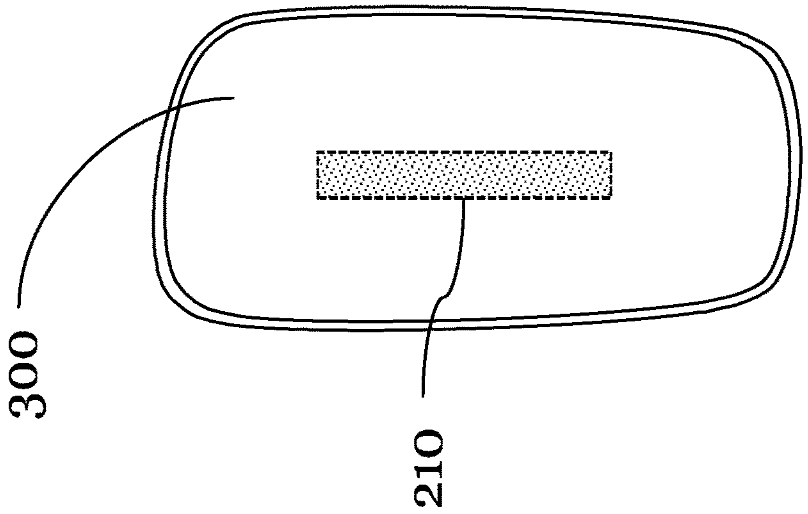

FIG. 2A shows an aerosol generation device 100 with an exterior wall 200 of the device housing. The exterior wall 200 substantially consists of a light-transmissive portion that 300 that covers an illumination unit 210 that is not emitting light. When the illumination unit 210 is not emitting light, the illumination unit is not visible through the light-transmissive portion 300 to the exterior of the aerosol generation device by the human eye. The dotted rectangle in FIG. 2A merely shows a position and extent of the illumination unit 210. The light-transmissive portion may comprise a laminar structure as described below in the context of FIGS. 3A, 3B and 3C. The light-transmissive-portion may be provided with a glossy, mirrored, or matte exterior surface finish, and the housing of the aerosol generation device may be provided with the same surface finish as the light-transmissive portion, such that an appearance of the exterior surface of the housing cannot be substantially distinguished from an appearance of the exterior surface of the light-transmissive portion.

FIG. 2B shows an aerosol generation device 100 with an exterior wall 200 of the device housing, wherein the exterior wall 200 comprises a light-transmissive portion that is only partially the size of the of the exterior wall 200. While the light-transmissive portion is depicted to have a rectangular shape, the shape and/or size the light-transmissive portion may be of any appropriate shape, such as for example, but not limited to, the shapes and sizes of the light-transmissive portion as described in the context of FIGS. 5A to 5D. While a size and position of the illumination unit or illumination region that is covered by the exterior wall 200 and the light-transmissive portion is depicted to substantially match a size and position of the light-transmissive portion in the front view of the aerosol generation device, the size and position of the illumination unit or illumination region may be of any appropriate size and at any appropriate position. The former configuration however is preferred for an optimal illumination performance of the illumination unit through the light-transmissive portion. It should be noted that the illumination unit is covered by and hence not visible through the exterior wall 200 and the light-transmissive portion 300 when the illumination unit is not emitting light.

FIG. 2C shows an aerosol generation device that may an aerosol generation as described in the context of FIGS. 2A and 2B. In the state shown in FIG. 2*c*, the illumination unit and its illumination region 210 is emitting light. Light emitted by the illumination region 210 is transmitted through the light-transmissive portion 300 and visible to an exterior of the device, in particular the human eye of a user of the aerosol generation device, such that the illumination region 210 provides visual feedback indicative of states of the aerosol generation device or a consumable in use with the aerosol generation device. While the illumination unit and illumination region 210 are shown to emit light at a single brightness level for the entire illumination region, two different brightness levels and regions of the illumination region 210 with different brightness levels are also possible. Such embodiments of the illumination are described in a non-limiting manner in the context of FIGS. 4A to 5D.

It should be noted that in any of the embodiments of the invention described herein, the term "non-visible" denotes that the illumination unit cannot be seen through the light-transmissive portion by a naked human eye, under commonly occurring ambient lighting conditions, without any special viewing aids or equipment or under special, not naturally occurring lighting conditions, when the illumination unit is not emitting light.

Figure 3A:
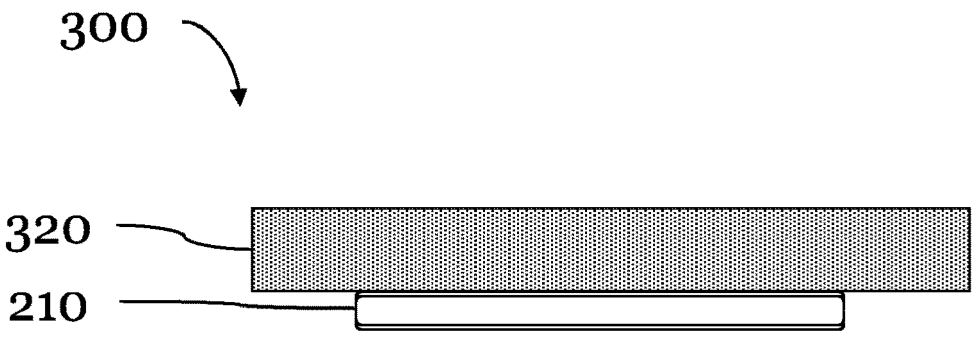
FIGS. 3A, 3B and 3C show schematic illustrations of a laminar structure of a light-transmissive portion, respectively, according to embodiments of the invention.

FIG. 3A shows a schematic illustration of a structure of the light-transmissive portion 300. In its simplest form, the light-transmissive portion 300 may comprise a translucent layer 320. The translucent property of the layer is such, that more of the light that is incident from an exterior of the aerosol generation device onto the translucent layer 320 is reflected or scattered back towards the exterior of the device, than is transmitted through the translucent layer 320, reflected by the illumination unit 210 back towards the translucent layer 320 and subsequently transmitted through the translucent layer 320 back to the exterior of the aerosol generation device.

Figure 3B:
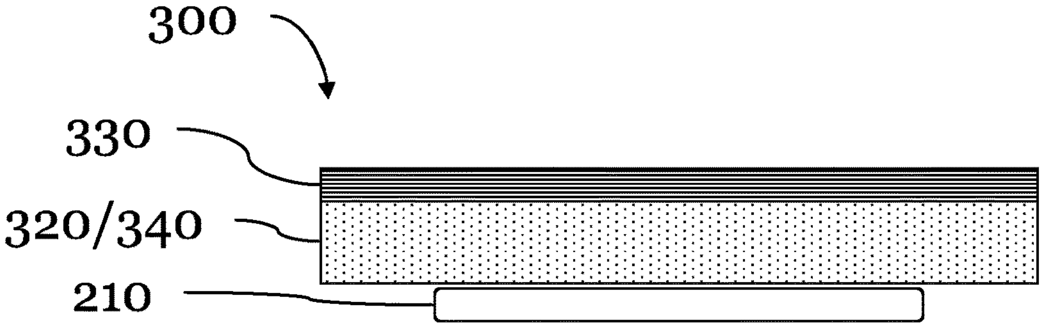

As shown in FIG. 3B, the light-transmissive portion comprises a laminar structure that comprises a translucent layer 320 or a partially or fully transparent layer 340 that is arranged closer to the illumination unit 210, and a light-reflective layer 330 that is arranged on a surface of the translucent layer 320 or the partially or fully transparent layer 340 further away from the illumination unit 210 than the translucent layer 320 or the partially or fully transparent layer 340. The translucent layer 320 and the partially or fully transparent layer 340 comprise translucent or partially or fully transparent plastic materials such as PMMA, PVC, PC, PET, PTFE, a resin-based material, or a similar material.

The partially light-reflective layer may be achieved by means of a physical vapor deposition (PVD), chemical vapor deposition (CVD) and/or non-conducting vacuum metallization (NCVM) process or similar deposition method. The deposited material may comprise a copper, silver, bronze or similar metallic material. The partially light-reflective layer 330 may be an exterior layer that forms the exterior surface of the light-transmissive portion and, additionally, may provide the light-transmissive portion with a glossy or mirrored surface finish.

Figure 3C:
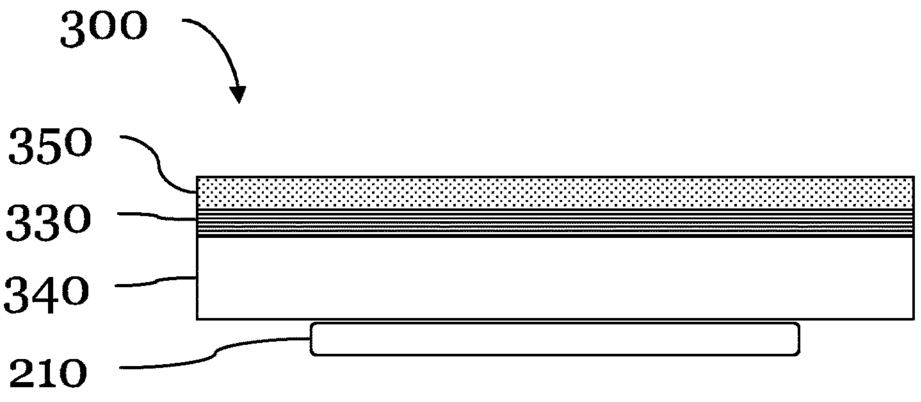

As shown in FIG. 3C, the laminar structure of the light-transmissive portion may comprise a transparent layer 340 arranged closest to the illumination unit 210. A partially light-reflective layer 330 as described above in the context of FIG. 3B is arranged on the transparent layer 340 further away from the illumination unit 210. A light-diffusive layer 350 is arranged on a surface of the light-reflective layer 330 furthest away from the illumination unit 210 and forms the exterior surface of the light-transmissive portion 300. The light-diffusive layer 350 may form the exterior surface of the light-transmissive portion 300. The light-diffusive layer 350 may form a layer that protects the light-reflective layer from external influences and may comprise a resin-based material or a transparent plastic material. Furthermore, the light-diffusive layer 350 may be colored or tinted to provide the light-transmissive portion 300 with a desired visual effect, and additionally, may provide the external surface of the light-transmissive portion with matte surface finish.

It should be noted that the layers of the laminar structure, as described above in the context of FIGS. 3A to 3C, may be arranged in a different layered order. For example, in the embodiments described in the context of FIG. 3B, the light-reflective layer 330 may be arranged closest to the illumination unit 210, or in the embodiments described in the context of FIG. 3C, the light-reflective layer 330 may be arranged furthest away from the illumination unit 210 and form the exterior surface of the light-transmissive portion 300. Additionally, the light-reflective layer 330 may provide the light-transmissive portion 300 with a glossy or mirrored surface finish.

The light-reflective layer 330 reflects some light and is penetrated by the rest. Light can pass through the light-reflective layer 330 in both directions. However, when the illumination unit 210 does not emit light and the illumination region is kept dark behind the light-transmissive portion 300, relative to a surrounding area of the aerosol generation device, which is typically a bright side in this case, the dark side become difficult to see from the bright side because the dark side is masked by the much brighter reflection of the bright side.

More specifically, the light from the bright side reflected by the light-reflective layer 330 back into the same side is much greater than the light transmitted from the dark side, overwhelming the small amount of light transmitted from the dark to the bright side. This is how the illumination unit 210 is kept invisible when it doesn't emit light. On the other hand, when the illumination unit 210 emits light, the illumination region becomes a bright side and the light transmitted from the illumination unit 210 is bright enough to be visible through the light-transmissive portion 330, without being overwhelmed by the light from the surrounding area reflected by the light reflective layer 330. In this way, the light-transmissive portion 330 operates like an one-way mirror and makes the illumination unit 210 either visible or invisible from the surrounding area depending on whether the illumination unit 210 is lit or not.

It should be noted that in case the housing of an aerosol generation device according to embodiments of the invention comprises a main body and a movable panel member that comprises or substantially consists of the light-transmissive portion, the panel member and the main body are coupled close to each other to substantially prevent any light emitted from the illumination unit arranged on the main body from leaking out from between the panel member and the main body unit to prevent any leakage light from negatively impacting visibility of the illumination region through the light-transmissive portion.

Figures 4A, 4B, 4C, 4D:
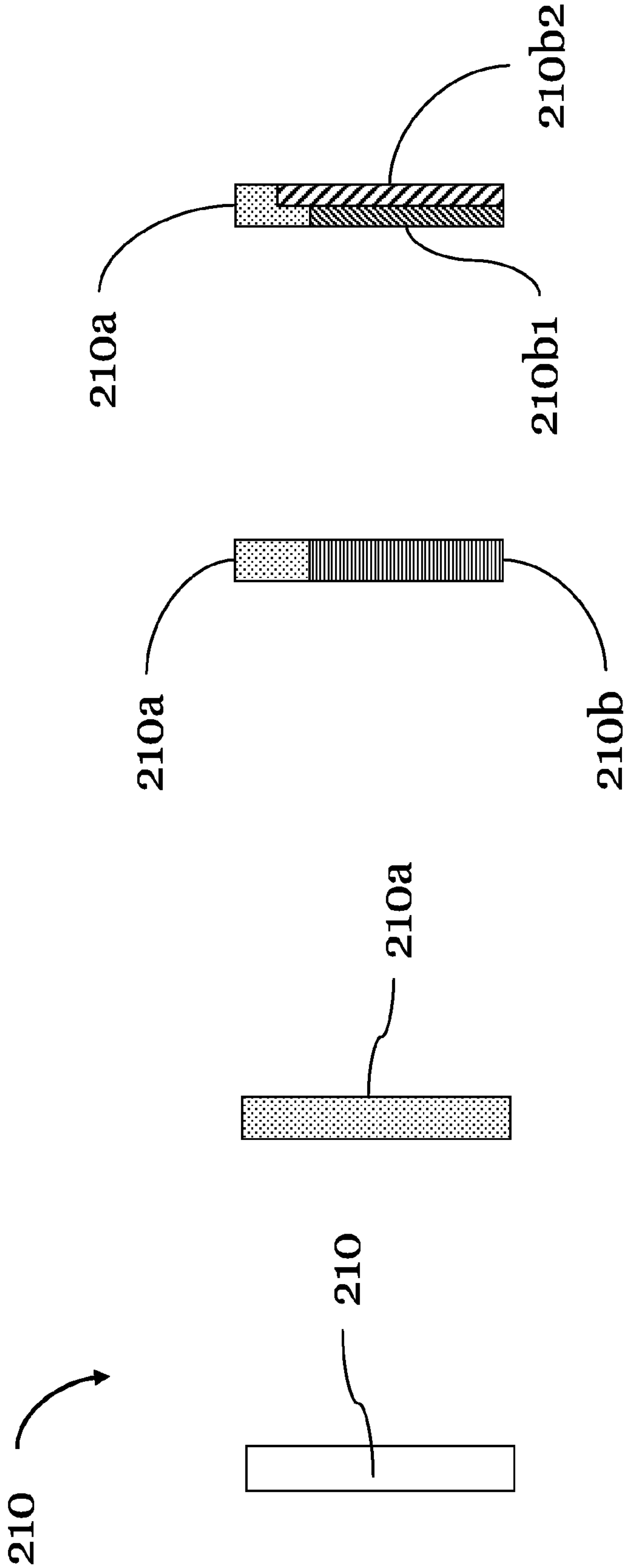
FIGS. 4A, 4B, 4C and 4D show schematic illustration of an illumination, respectively, according to embodiments of the invention.

FIG. 4A depicts an illumination unit 210 comprising a plurality of light sources. Each of the light sources may be an LED light source that may additionally emit light in different colors. The illumination unit 210 as shown in FIG. 4A is not emitting light and therefore in an "off" state. While the illumination unit is shown to be of a rectangular size, the plurality of light source may be arranged such that they form any appropriately sized contiguous and appropriate shape.

In FIG. 4B, all of the plurality of light sources of the illumination unit are emitting light to form a contiguous illumination region 210 that substantially matches the size and shape of the illumination unit. Alternatively, only a portion of the plurality of light source may emit light to form an illumination region 210 wherein the full extent of the illumination region 210 is different from the full extent of the illumination unit. The illumination region 210 may be illuminated at a first brightness level when the plurality of light source operating at a first power level form a region 210*a* illuminated at the first brightness level. In this state, the illumination unit is in an "on" state and provides visual feedback that states of the aerosol generation are being indicated by the illumination unit. When all of the plurality of light sources of the illumination unit are emitting light at a second brightness level by operating at a second power level to form a region illuminated at the second brightness level, the difference in brightness levels enables the illumination unit to indicate a state of the aerosol generation device or of the consumable in use with the aerosol generation device. For example, when illuminated at the first brightness level, the illumination unit indicates that the aerosol generation device is turned on and not ready for use by a user, and when illuminated at the second brightness level, the illumination indicates that the aerosol generation device is turned on and ready for use by a user.

In FIG. 4C, the full extent of the illumination region 210 is the combined extent of a region 210*a* illuminated at the first brightness level and the region 210*b* illuminated at the second brightness level. This configuration enables the illumination unit to indicate states of the aerosol generation device or a consumable in use with the aerosol generation device within a reference range of values or relative to a reference value, wherein the full extent of the illumination region may correspond to a maximum range of possible values or a maximum reference value for the indicated state. The indicated state may be based on the relation between the extent of the region 210*b* illuminated at the second brightness level and the full extent of the illumination region. For example, the full extent of the illumination region may correspond to a range of 0% to 00% of, for example, the charging level of a battery provided as a power source in the aerosol generation device, or the full extent of the illumination region may correspond to a range between a maximum amount of an aerosol generation substrate in the consumable and the level of full depletion of the aerosol generation substrate. The relative extent of the region 210*b* illuminated at the second brightness level compared to the full extent of the illumination region may consequently corresponds to a relative range of values or a value within the maximum range of values. For example, if the extent of the region 210*b* is only 60% percent of the full extent of the illumination region 210, the indicated state may therefore be a battery at a charging level of 60% compared to a full charging level of the battery.

As shown in FIG. 4D, the region 210*b* may comprise two regions 210*b*1 and 210*b*2 as patterns that may be the same or different from each other. The extent of the pattern 210*b*1 and the extent of the pattern 210*b*2 may be different from each other and may be independent from each other. In this configuration, the patterns 210*b*1 and 210*b*2 may each indicate different states of the aerosol generation device or consumable in use with the aerosol generation device. For example, the pattern 210*b*1 may indicate, in a manner as described in the context of FIG. 4C, the charging level of the battery of the aerosol generation device, and the pattern 210*b*2 may indicate the aerosol generation substrate depletion level of the consumable in use with the aerosol generation device.

The states that may be indicated by visual feedback comprise elapsed and/or remaining start-up time period of the device, total amount of puffs by user, total amount of puffs by user in relation to a predetermined maximum amount of puffs for a consumable, total time of use of a consumable in relation to a predetermined maximum of time of use for a consumable, time of use of the device since start-up, consumed and/or remaining amount of aerosol generation substrate in the consumable, an operational temperature of the device, and depletion level of a battery of the device, charging status of the battery etc.

Additionally, a pattern 210*a*/210*b* of the illumination region 210 may be a dynamically changing or moving pattern. Furthermore, the moving direction of the pattern may indicate a change in a state indicated by the pattern. For example, in the embodiments described in the context of FIG. 4C, the illumination unit may comprise a pattern that indicates a battery depletion level. The pattern may repeatedly move in an upwards direction, then reset to its original position, and then move upwards again, to not only indicate charging/depletion level of the battery, but that the battery is being charged, i.e. that the charging level of the battery is increasing.

Additionally, or alternatively, any pattern on the illumination region 210 may dynamically change by, for exampling, periodically blinking, to indicate a state of the aerosol generation device. Additionally, or alternatively, only one of the plurality of light source may emit light, and an adjacent light source of the plurality of light sources following in a direction of the illumination unit may start emitting light when previous light source stops emitting light after a predetermined amount of time to form a pattern of a moving light source to indicate a state of the aerosol generation device.

Such states may comprise, for example, a low charging level of the battery, a low remaining amount of an aerosol generation substrate in the consumable in use with the aerosol generation device, or a malfunction of the aerosol generation device.

Figure 5A:
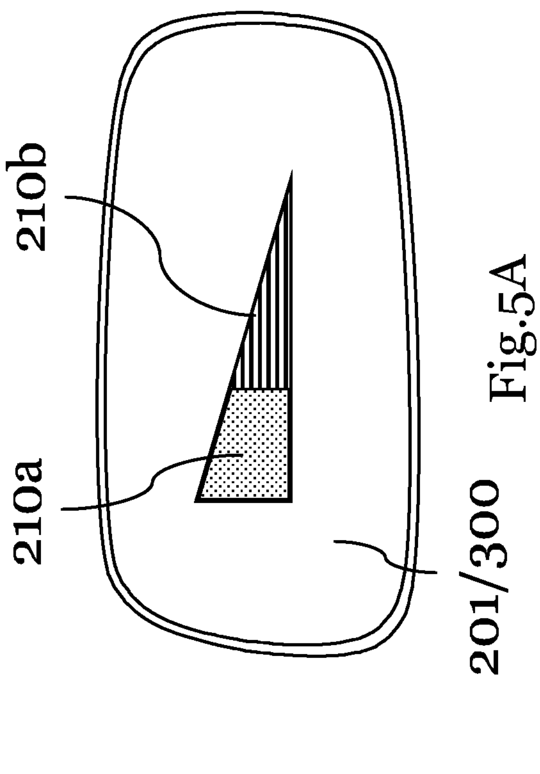
FIGS. 5A, 5B, 5C, and 5D show schematic illustrations of a front view of an aerosol generation device with an illumination unit, respectively, according to embodiments of the invention.
Figure 5B:
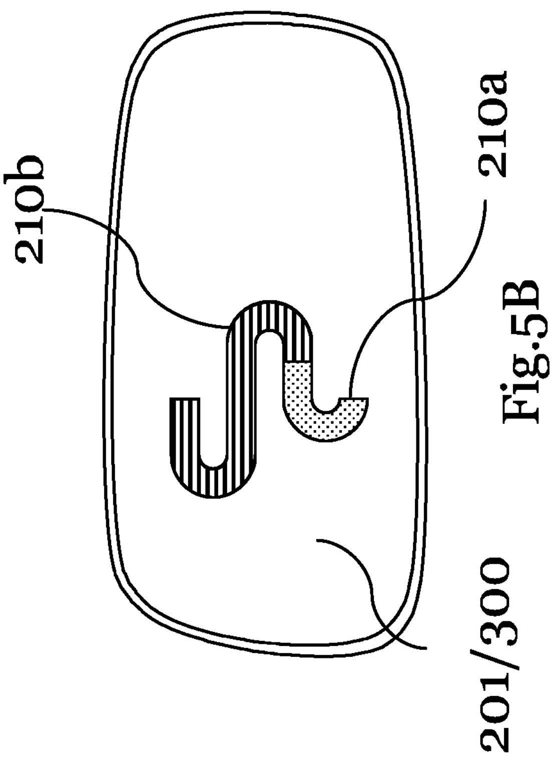
Figure 5C:
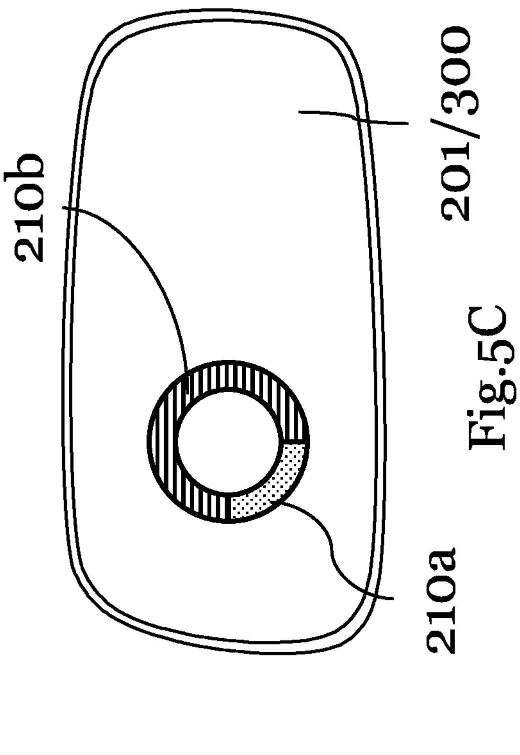
Figure 5D:
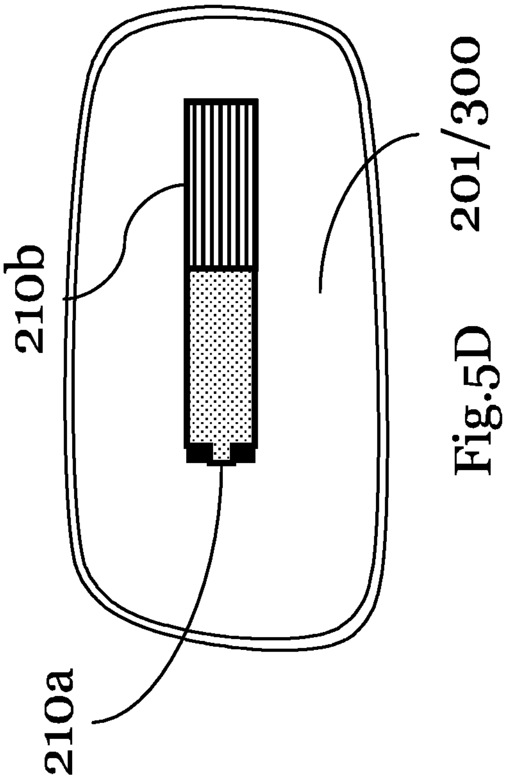

FIGS. 5A, 5B, 5C and 5D show aerosol generation devices 100 that may be aerosol generation device as described in the context of any one of the FIGS. 1A to 3C. For example, the exterior wall 200 may substantially consist of a light-transmissive portion 300 or may comprise a light-transmissive portion 300 that is only partially the size of the exterior wall. The aerosol generation device comprises an illumination unit 210 that may be an illumination unit 210 as described in the context of any one of the FIGS. 1A to 4C. Each of the illumination units 210 shown in FIGS. 5A to 5D comprises a plurality of light sources that are arranged to form a contiguous illumination region 210 when emitting light, wherein the illumination region 210 may be of different sizes and of different shapes, such as a triangular shape, a bent and/or curved shape, or a circular/elliptic shape. In particular, as shown in FIG. 5D, the illumination region 210 may comprise a pattern that is shaped such that the visual appearance of the shape is indicative of the type of state indicated by the pattern. For example, the pattern may have a shape reminiscent of the shape of a battery to indicate that visual feedback provided by the illumination region 210 indicates a state of the battery of the aerosol generation device such as the charging/depletion level of the battery.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the independent and dependent claims.

LIST OF REFERENCE SIGNS USED

100: Aerosol generation device
110: consumable/aerosol generating substrate
120: power supply
130: circuitry
200: exterior wall
210: illumination unit/region
210*a*: illumination unit/region at first brightness
210*b*: illumination unit/region at second brightness
300: translucent portion
310: translucent layer
320: partially reflective layer
330: transparent layer
340: protective layer

The invention claimed is:

1. An illumination unit for an aerosol generation device, comprising:
a plurality of light sources,
wherein one or more light sources of the plurality of light sources form a contiguous illumination region when the one or more light sources of the plurality of light sources are emitting light;
wherein each light source of the plurality of light sources is configured to operate in:
a first power operation mode with a first brightness level illuminating a portion of the illumination region at the first brightness level, and
a second power operation mode with a second brightness level different from the first brightness level for illuminating the portion at the second brightness level different from the first brightness level;
wherein the illumination region is configured to provide to a user visual feedback that indicates a state of the aerosol generation device or a consumable used with the aerosol generation device,
wherein the illumination region comprises a region configured to be illuminated at the first brightness level and a region configured to be illuminated at the second brightness level.

2. The illumination unit according to claim 1, wherein a full extent of the illumination region is:
either an extent of a region illuminated at the first brightness level, when the illuminated region contains only the region illuminated at the first brightness level,
or a combined extent of a region illuminated at the first brightness level and a region illuminated at the second brightness level, when the illumination region contains only the region illuminated at the first brightness level and the region illuminated at the second brightness level,
or an extent of a region at the second brightness level, when the illumination region contains only the region illuminated at the second brightness level.

3. The illumination unit according to claim 2, wherein the visual feedback is based on a relation between the extent of the region at the second brightness level and the full extent of the illumination region.

4. The illumination unit according to claim 3, wherein full extent of the illumination region is indicative of a maximum range of values for states indicated by the visual feedback.

5. The illumination unit according to claim 4, wherein the extent of the region illuminated at the second brightness level is indicative of a sub-range within the maximum range of values, and an extent of the sub-range in relation to an extent of the maximum range of values corresponds to the extent of the region illuminated at the second brightness level in relation to the full extent of the illumination region.

6. The illumination unit according to claim 1, wherein each light source of the plurality of light sources is an LED which is capable of emitting light in a plurality of colors.

7. The illumination unit according to claim 6, wherein the illumination region is illuminated in a color.

8. The illumination unit according to claim 7, wherein different colors of the illumination region are indicative of different states of the aerosol generation device or a consumable used with the aerosol generation device.

9. The illumination unit according to claim 1, configured to form one or more patterns on the illumination region, wherein each pattern of the one or more patterns is indicative of different states of the aerosol generation device or a consumable used with the aerosol generation device.

10. The illumination unit according to claim 9, wherein at least one pattern of the one or more patterns includes a moving pattern.

11. The illumination unit according to claim 10, wherein a moving direction of the at least one pattern of the one or more patterns indicates a change in a state indicated by the at least one pattern of the one or more patterns.

12. The illumination unit according to claim 1, wherein states of the aerosol generation device or a consumable used with the aerosol generation device comprise information on at least one of: elapsed and/or remaining start-up time period of the device, user's vaping progress on the device, time of use of the device since start-up, consumed and/or remaining amount of aerosol generation substrate in the consumable, an operational temperature of the device, and depletion level of a battery of the device.

13. The illumination unit according to claim 12, wherein the start-up time period is a time period required for heating-up a heating unit comprised by the aerosol generation device before the user can start consuming the consumable.

14. The illumination unit according to claim 1, wherein the plurality of light sources are arranged in a straight or curved line and the illumination region comprises a curved or bent shape.

15. The illumination unit according to claim 1, wherein the second brightness level is higher than the first brightness level.

16. The illumination unit according to claim 1, wherein the first brightness level is at least 2% of a maximum brightness of each light source of the plurality of light sources, and at most 30% of the maximum brightness of each light source of the plurality of light sources.

17. The illumination unit according to claim 1, wherein the second brightness level is at least 70% of a maximum brightness of each light source of the plurality of light sources.

* * * * *